United States Patent
Klein

(10) Patent No.: US 6,304,923 B1
(45) Date of Patent: Oct. 16, 2001

(54) METHOD FOR PRIORITIZING DATA TRANSFER REQUEST BY COMPARING A LATENCY IDENTIFIER VALUE RECEIVED FROM AN I/O DEVICE WITH A PREDETERMINED RANGE OF VALUES

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/172,923

(22) Filed: Oct. 14, 1998

(51) Int. Cl.$^7$ .................................................. G06F 13/18
(52) U.S. Cl. ............................ 710/41; 710/40; 710/113; 710/116
(58) Field of Search .......................... 710/41, 113, 116, 710/40

(56) References Cited

U.S. PATENT DOCUMENTS

| | | | |
|---|---|---|---|
| 5,278,967 | 1/1994 | Curran | 395/425 |
| 5,394,541 * | 2/1995 | Chesley et al. | 711/167 |
| 5,506,968 * | 4/1996 | Dukes | 710/240 |
| 5,555,383 | 9/1996 | Elazar et al. | 395/306 |
| 5,818,464 | 10/1998 | Wade | 345/501 |
| 5,862,353 | 1/1999 | Revilla et al. | 395/287 |
| 5,862,355 * | 1/1999 | Logsdon | 395/296 |
| 5,956,493 * | 9/1999 | Hewitt et al. | 711/113 |
| 5,996,037 | 11/1999 | Emnett | 710/117 |
| 6,078,976 | 6/2000 | Obayashi | 710/128 |

FOREIGN PATENT DOCUMENTS

97/29432 * 8/1997 (WO) .

* cited by examiner

*Primary Examiner*—Thomas Lee
*Assistant Examiner*—Ilwoo Park
(74) *Attorney, Agent, or Firm*—Dorsey & Whitney LLP

(57) ABSTRACT

A method is described for controlling data transfer operations between a main memory and other devices in a computer system. Data transfer request signals and associated latency identification values are received. Each of the latency identification values corresponds with a maximum time interval in which to service the respective data transfer request. The latency identification values are periodically modified and compared to indicate the current highest priority request. In the event that service of a particular requested data transfer operation must be provided imminently, priority override functionality is provided. In this way, those devices having particular latency requirements can be provided with timely access to the main memory, and need not have separately dedicated memory or buffers.

16 Claims, 6 Drawing Sheets

METHOD FOR PRIORITIZING DATA TRANSFER REQUEST BY COMPARING A LATENCY IDENTIFIER VALUE RECEIVED FROM AN I/O DEVICE WITH A PREDETERMINED RANGE OF VALUES

TECHNICAL FIELD

This invention relates generally to controlling data transfer between a memory and a device in a computer system, and more particularly, to prioritizing service of multiple data transfer requests.

BACKGROUND OF THE INVENTION

In a typical computer system, multiple devices are able to write data to and read data from a main memory. A memory controller couples these devices with the main memory and controls the timing and sequence of such data transfer operations. Referring to FIG. 1, a memory controller 10 includes arbiter circuitry 12 that receives a plurality of signals indicative of requests for data transfer operations—commonly known as priority requests PREQ 0-PREQ M. Each of these priority request signals corresponds to a device requesting to write data to or read data from a main memory 14. Example devices include a microprocessor and input/output (I/O) devices, such as peripheral component interconnect (PCI) bus devices, industry standard architecture (ISA) bus devices, integrated drive electronics (IDE) devices, accelerated graphics port (AGP) devices, small computer system interface (SCSI) devices, and universal serial bus (USB) devices, to name just a few examples. The arbiter 12 prioritizes the various priority requests, and the memory controller 10 correspondingly initiates and controls the data transfer operations.

Typically, the priority requests are simply queued by the arbiter 12, with the requested data transfer operations occurring on a first-come first-served basis. Certain of today's computer systems can reorder some data transfer operations, such as by providing "read around write" capability. Also, certain computer systems allow various write operations to be reordered or combined to minimize the frequency of write operations to the memory subsystem. Some computer systems provide fixed service priorities, in which priority requests from some devices (e.g., the CPU) always receive service prior to priority requests from other devices.

Many devices included in today's computer systems have maximum latency requirements—i.e., a maximum time interval following the requested data transfer operation by which such operation must be effected. For example, a video display device typically requires regular refresh of the display. The display refresh must occur regularly and timely to avoid undesirable artifacts showing on the display. As another example, a software-based modem requires timely transfer of coder/decoder (CODEC) data in order to avoid corruption of the modem data. To satisfy such latency requirements, today's computer systems include separately dedicated memories or device buffers. For example, the video display in today's computer systems commonly has a separately dedicated video memory and associated video memory controller. As another example, software-based modems have a large CODEC data buffers for storing received data and transmit data.

Given the improved production economies and performance improvements offered by today's increasingly integrated computer systems, it is highly desirable to minimize the number of separately dedicated memory circuits and associated controller circuits. However, today's main memory access arbitration schemes cannot satisfy the latency requirements of certain devices commonly included in a computer system.

SUMMARY OF THE INVENTION

In accordance with the present invention, a method is provided for controlling data transfer operations between a memory and a device in a computer system. The method includes receiving a data transfer request and a latency identifier value corresponding with a maximum time interval for servicing the data transfer request. The method further includes waiting for a time interval no greater than the maximum time interval and then servicing the data transfer request. The latency identifier value may be successively modified and compared to a predetermined value, with servicing of the data transfer request then being initiated on the basis of that comparison.

Multiple latency identifiers corresponding with data transfer requests from multiple computer system devices may be received, with one or more of the multiple latency identifiers being successively modified as time goes on. Comparing the multiple latency identifiers may be performed to identify a most urgent data transfer request. The latency identifier value corresponding with the most urgent data transfer request may then be compared to a predetermined range of values. If it is determined that this latency identifier value falls within the predetermined range of values, then servicing of the most urgent data transfer request is initiated.

DETAILED DESCRIPTION OF THE INVENTION

In the following, a novel method and apparatus is described for controlling data transfer operations between a memory and a device in a computer system. Certain specific details are set forth to provide a sufficient understanding of the present invention. It will be clear, however, to one skilled in the art, that the present invention may be practiced without these details. In other instances, well-known circuits, control signals, timing protocols, and software operations have not been shown in detail in order to avoid unnecessarily obscuring the invention.

Figure 2:
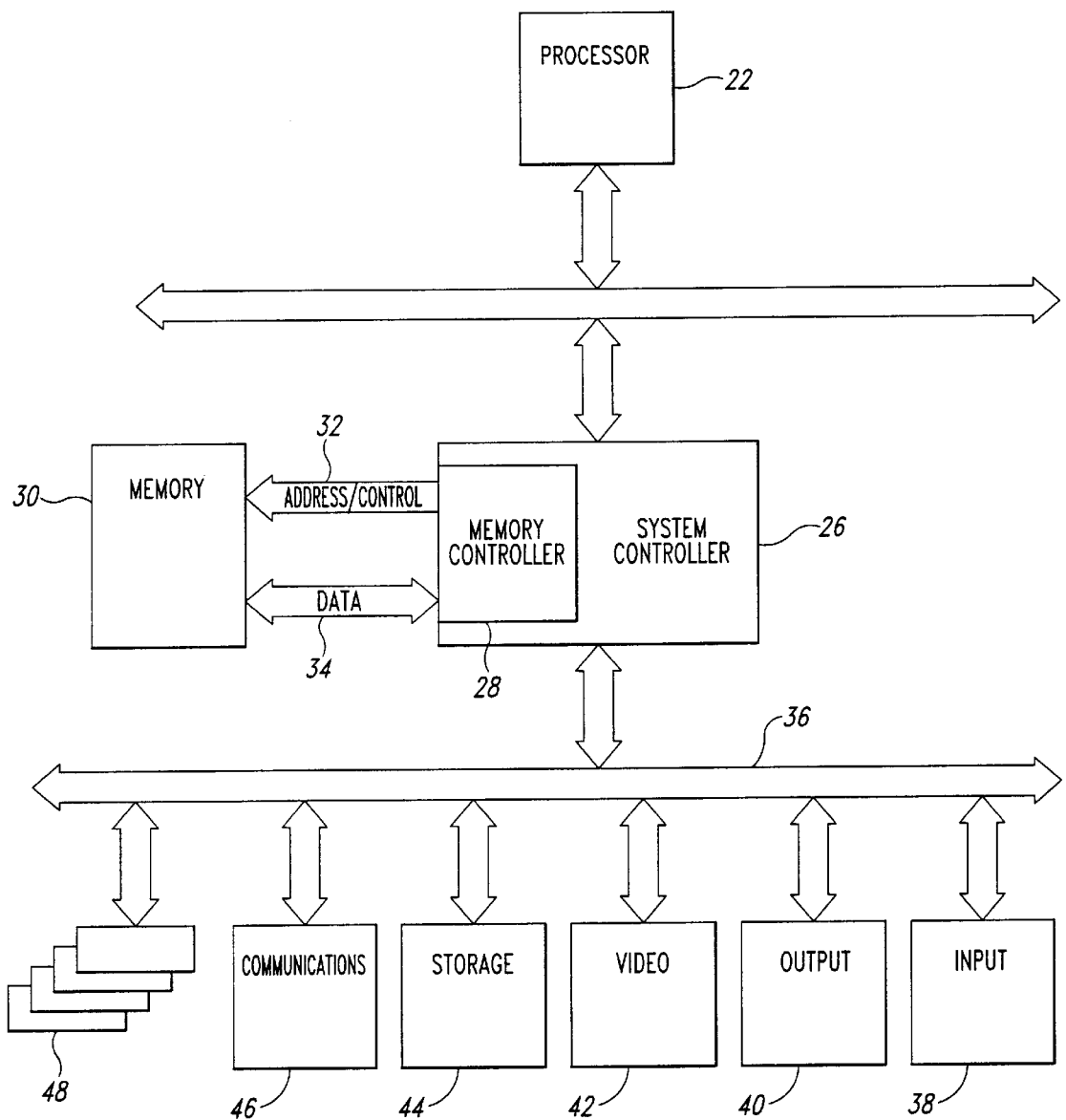
FIG. 2 is a functional block diagram depicting a computer system in accordance with an embodiment of the present invention.

FIG. 2 shows a computer system 20 in accordance with an embodiment of the present invention. A microprocessor 22 is coupled with a system controller 26 by a processor bus 24 that carries address, data, and control signals therebetween. The system controller 26 includes a memory controller 28 for accessing a main memory 30 via a memory address/control bus 32 and a memory data bus 34. As understood by those skilled in the art, the address/control bus 32 may itself be separate, parallel address and control signal paths, or the address and control signals may be provided serially, or in some other suitable combination. The memory 30 may include any of a wide variety of suitable memory devices. Example memory devices include dynamic random access memory (DRAM) devices such as synchronous DRAMs, SyncLink DRAMs, or Direct RAMBUS DRAMs.

The system controller 26 also functions as a bridge circuit (sometimes called a North bridge) between the processor bus 24 and a system bus, such as I/O bus 36. The I/O bus 36 may itself be a combination of one or more bus systems with associated interface circuitry (e.g., AGP bus and PCI bus with connected SCSI and ISA bus systems). Multiple I/O devices 38–46 are coupled with the I/O bus 36. A data input device 38, such as a keyboard, a mouse, etc., is coupled with the I/O bus 36. A data output device 40, such as a printer, is coupled with the I/O bus 36. A visual display device 42 is another data output device that is coupled with the I/O bus 36. A data storage device 42, such as disk drive, tape drive, CD-ROM drive, etc., is coupled with the I/O bus 36. A communications device 46, such as a modem, local area network (LAN) interface, etc., is coupled with the I/O bus 36. Additionally, expansion slots 48 are provided for future accommodation of other I/O devices not selected during the original design of the computer system 20.

Although FIG. 2 depicts the various I/O devices 38–46 as being coupled with the system controller 26 via a single shared I/O bus 36, one or more of the I/O devices may have a separately dedicated interface connection to the system controller 26. Alternatively, one or more of the I/O devices 38–46 may be coupled with the system controller 26 via a multiple bus and bridge network. As a further alternative, one or more of the I/O devices 38–46 may be coupled with the system controller 26 partly through a shared bus system and partly through separately dedicated signal line connections. Indeed, those skilled in the art will understand the depiction of FIG. 2 to encompass any of a wide variety of suitable interconnection structures between the memory 30, the memory controller 28, and the I/O devices 38–46.

Figure 1:
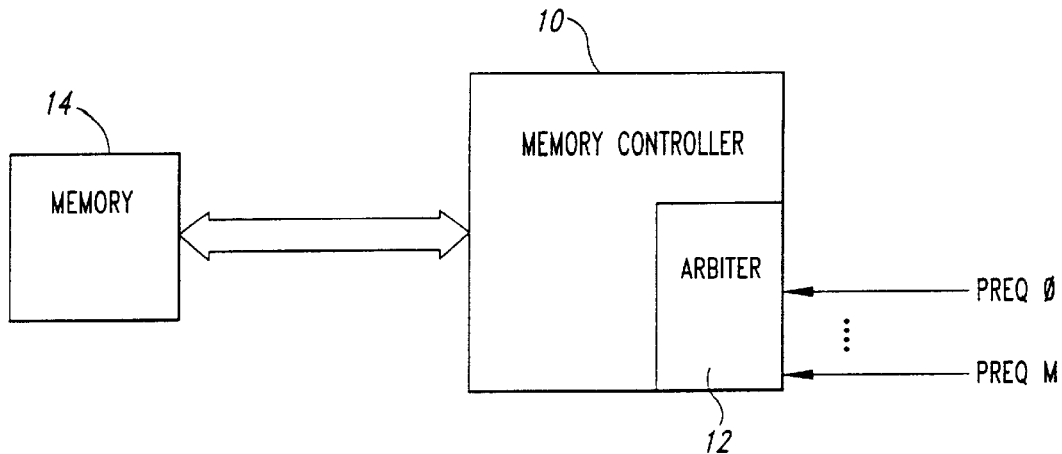
FIG. 1 is a functional block diagram depicting a memory and a memory controller in accordance with the prior art.
Figure 3:
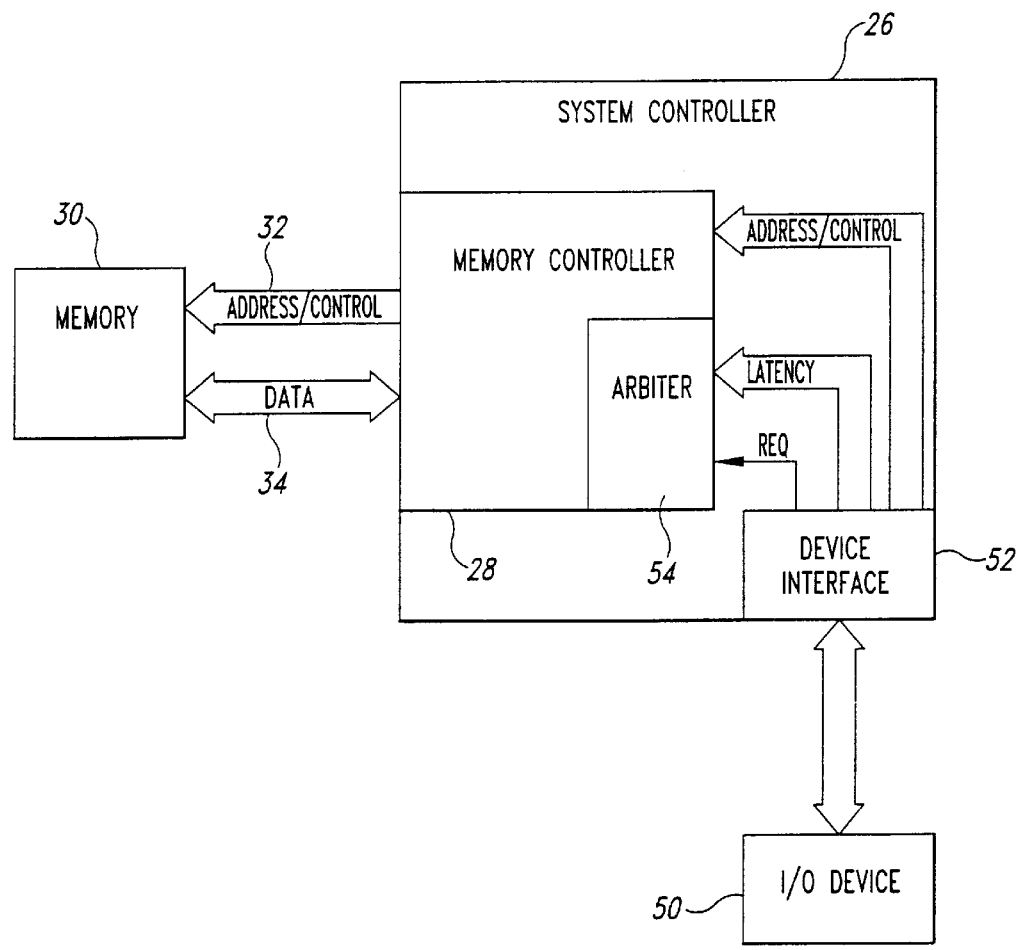
FIG. 3 is a functional block diagram depicting certain details of a system controller include e computer system shown in FIG. 2.

FIG. 3 shows the connection between the memory controller 28 and a representative I/O device 50 at a device interface 52 integrated within the system controller 26. As mentioned above, the device interface 52 may be a separately dedicated connection for the particular I/O device 50, a shared bus interface, or other suitable signal interface circuitry. When the I/O device 50 desires access to the memory 30, the device interface 52 applies a data transfer request signal REQ to the memory controller 28, as is done in conventional computer systems. The memory controller 28 includes arbiter circuitry 54 that receives the REQ signal. In contrast with conventional computer systems, the arbiter 54 also receives a latency identification value corresponding to the particular I/O device 50. The latency identification value may itself be provided by the I/O device 50, may be hard-coded into the device interface 52, or may be provided as a software ID in system configuration space, as will be understood by those skilled in the art. The memory controller 28 also receives an address corresponding to the location in the memory 30 that the I/O device 50 wishes to access.

The latency identification value provides the arbiter 54 with information concerning the maximum time interval during which the requested data transfer operation must be performed. As will be described in detail below, the memory controller 28 and arbiter 54 ensure that the requested data transfer operations occur within the maximum allowable latency period. Thus, in accordance with embodiments of the present invention, I/O devices with particular latency requirements need not have separately dedicated memory subsystems or buffers to ensure timely satisfaction of their data flow rate requirements.

FIG. 3 depicts only the single representative interface 52 between the memory controller 28 and the single representative I/O device 50. Those skilled in the art will understand that a plurality of such interfaces may be provided to handle the wide variety of data transfer operations between the main memory 30 and a plurality of other devices included within the computer system. Alternatively, a single interface may provide much of the signal routing for multiple devices, but with separate latency identification values for each of the devices using the interface.

Figure 4:
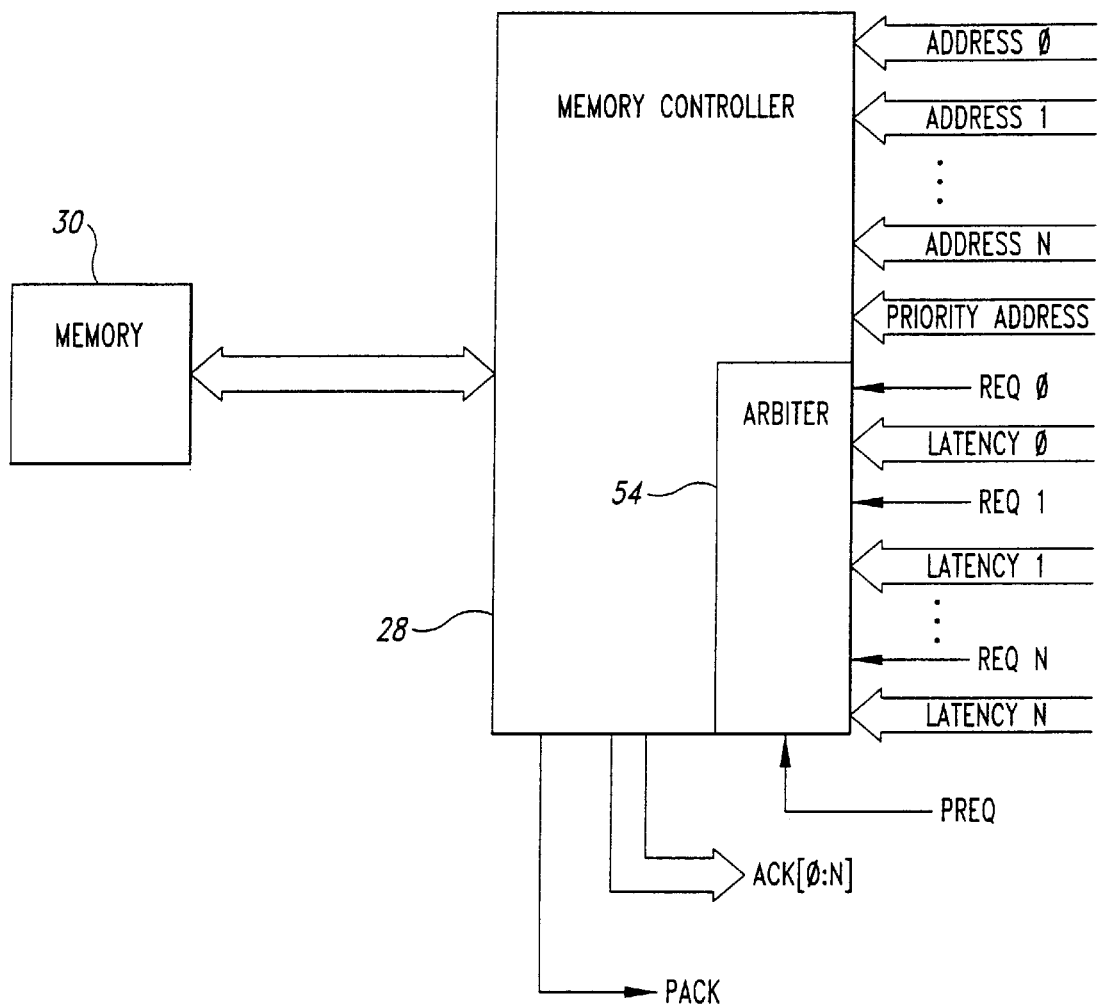
FIG. 4 is a functional block diagram depicting certain details of a memory controller included within the system controller shown in FIG. 3.

FIG. 4 shows the memory controller 28 and arbiter 54 receiving a plurality of data transfer request signals REQ 0–REQ N, together with associated latency identification values Latency 0–Latency N and memory address locations Address 0–Address N. The particular embodiment depicted in FIG. 4 also shows the memory controller 28 receiving a priority request signal PREQ and associated Priority Address. Thus, the memory controller 28 can include conventional priority arbitration as well as the novel latency-tagged arbitration. In the particular embodiment depicted in FIG. 4, the logic circuitry associated with conventional priority request arbitration schemes is located "upstream" from the memory controller 28. Thus, the priority request signal PREQ and associated Priority Address shown in FIG. 4 represent a single priority request passed from another arbitration circuit (not shown) ordering a plurality of priority requests with conventional circuits and methods. Of course, conventional arbitration circuitry could itself be integrated within the arbiter 54, in which case the arbiter would receive both conventional priority requests PREQ 0–PREQ M and the latency-tagged requests REQ 0–REQ N with associated latency values Latency 0–Latency N.

Figure 5:
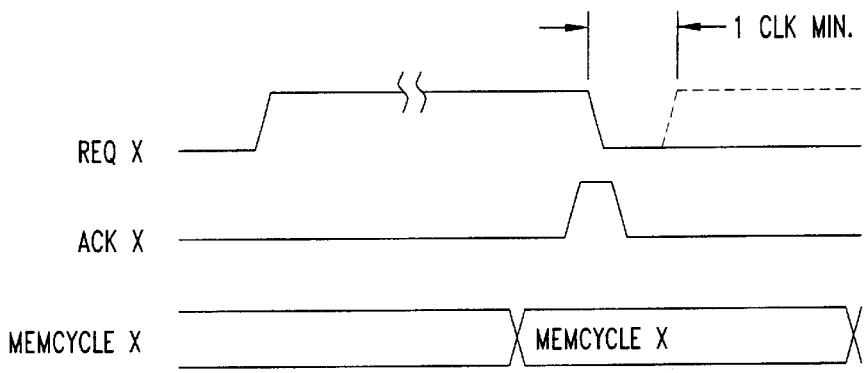
FIG. 5 is a signal timing diagram depicting the sequence and timing of certain signals applied to and produced by the memory controller shown in FIG. 4.

The memory controller 28 asserts respective acknowledge signals ACK[0:N] to the device interface 52, and a priority acknowledge signal PACK to the conventional priority arbitration circuitry or device interface, to acknowledge the particular data transfer request being serviced and to initiate associated data transfer operations. Referring to FIG. 5, a timing diagram depicts the corresponding signal sequence and timing. A data transfer request signal is depicted as REQ x, which may be any of the above-described latency-tagged requests or conventional priority request (PREQ). The request signal REQ x will remain asserted until service of the data transfer request has begun, which the memory controller 28 indicates with an asserted acknowledge pulse ACK x (or PACK). The memory controller 28 also provides the various well-known memory control signals necessary to accomplish the requested data transfer operation, which are depicted in the timing diagram of FIG. 5 as MEMCYCLE x.

Figure 6:
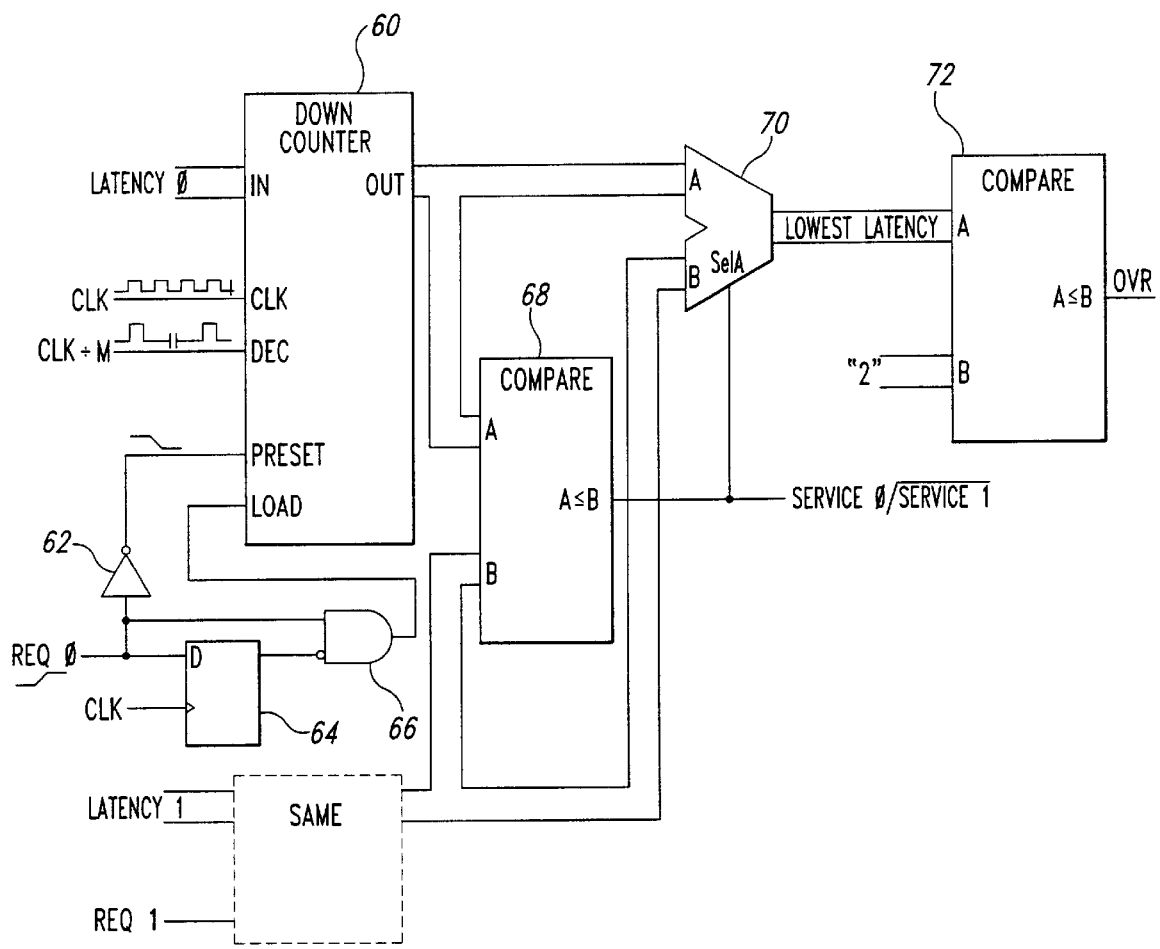
FIG. 6 is a part functional block, part schematic diagram depicting a portion of an arbiter circuit included within the memory controller shown in FIG. 4.
Figure 7:
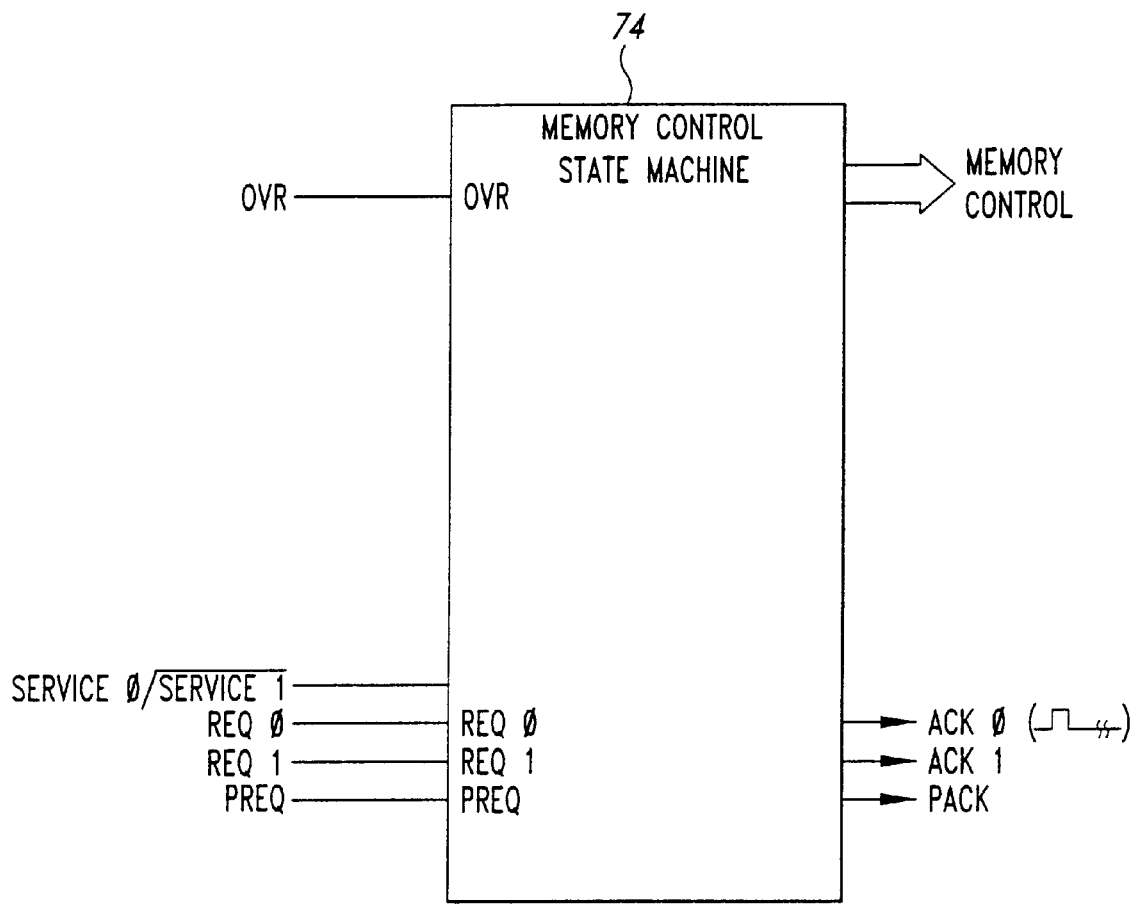
FIG. 7 is a functional block diagram depicting a memory control state machine included within the memory controller shown in FIG. 4.
Figure 8:
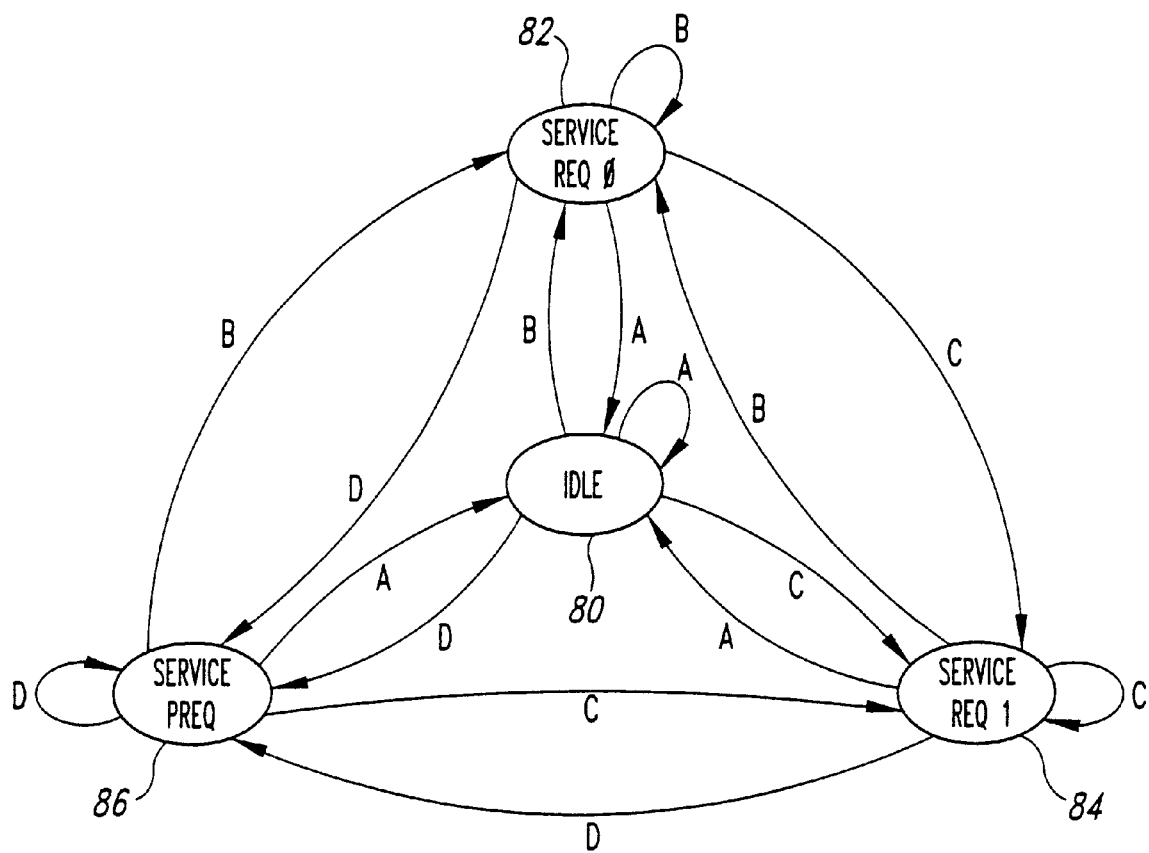
FIG. 8 is a state diagram depicting the operations of the memory control state machine shown in FIG. 7.

As described above, a memory controller 28 in accordance with the present invention receives a data transfer request signal and an associated latency identification value. The memory controller 28 is free to service other requests for data transfer operations subject to the requirement that the latency-tagged request is serviced within a maximum time interval corresponding to the latency identification value. Those skilled in the art will be able to implement such a memory controller and associated arbitration scheme in any of a number of suitable ways. One such implementation is described in connection with FIGS. 6–8. For purposes of simplicity, FIGS. 6–8 show arbitration between two latency-tagged requests REQ 0 and REQ 1 and a single conventional priority request PREQ. Those skilled in the art will understand how to extend the implementation to the general case of N latency-tagged requests and M priority requests.

Referring to FIG. 6, a synchronous down counter 60 loads the Latency 0 value at a counter input IN and produces a decremented latency value at a counter output OUT. Signals derived from the request signal REQ 0 are applied to Preset and Load inputs of the counter 60. When REQ 0 is deasserted, an inverter 62 then applies a corresponding asserted Preset signal, thereby maintaining the output produced by the counter 60 at a maximum, non-decrementing level. When, however, the REQ 0 signal is asserted, the Preset signal is deasserted and an asserted Load pulse is applied to the counter 60 through a synchronous latch 64 and AND gate 66, thereby loading the latency identification value Latency 0 into the counter.

The counter 60 is a synchronous counter, sampling various input signal states at times referenced to a system clock signal CLK. A reduced frequency clock signal CLK÷M is applied to the decrementing control input DEC of the counter 60 for successively decrementing the latency value produced at the counter output OUT. The reduced frequency clock signal CLK÷M is preferably derived from the system clock signal CLK and has a frequency associated with a typical memory cycle time. For example, if a typical memory cycle requires M cycles of the system clock, the reduced frequency clock signal would have one-Mth the frequency of the system clock. Those skilled in the art will understand that such a reduced frequency clock signal is readily provided by, for example, applying the system clock signal CLK to a conventional "divide-by-M counter," with the "Carry" output of such counter then providing the reduced frequency clock signal CLK÷M.

The data transfer request signal REQ I and the corresponding latency identification value Latency 1 (as well as the clock signals CLK and CLK÷M) are applied to a synchronous down counter and preset/load logic circuitry (not shown) of essentially the same configuration as shown in FIG. 6 and as described above in connection with REQ 0. The latency values produced at the counter outputs are then applied to the inputs of a first comparator 68 and to the inputs of a multiplexer 70. The first comparator 68 produces an output signal as a function of the comparison of the latency values, which signal is then used as a selection control signal for the multiplexer 70. The multiplexer 70 then passes whichever of the latency values is the lowest value. The signal output by the first comparator 68 also functions as a service priority signal Service 0/Service 1 with a logic state that indicates which of the requests has current priority for service.

A second comparator 72 compares the latency value passed by the multiplexer 70 to a predetermined value, which may be selected to correspond with a lowest acceptable latency value after which the requested data transfer must be initiated. In the event the lowest latency value output by the multiplexer 70 is less than or equal to this predetermined value, the comparator 72 asserts an override priority signal OVR.

Referring to FIG. 7, a memory control state machine 74 receives the override priority signal OVR, the service priority signal Service 0/Service 1, the latency-tagged request signals REQ 0 and REQ 1, and the conventional priority request signal PREQ. The memory control state machine 74 produces the various well-known memory control signals required to access the main memory 30 (see FIGS. 4 and 5) described above. The memory control state machine 74 also provides the acknowledge pulses ACK 0, ACK 1, PACK to acknowledge the respective requests and initiate associated data transfer operations.

FIG. 8 is a state diagram depicting the operations performed by the memory control state machine 74 of FIG. 7. Those skilled in the art will appreciate that the particular implementation of the memory control state machine 74 may be accomplished by any of a wide variety of approaches, including a microprocessor or controller executing software instructions, or hard-wired logic circuitry, to name a few examples. In the particular state diagram shown in FIG. 8, REQ 0 is always given priority over REQ 1, absent override priority. Also, the priority request PREQ is always serviced before the latency-tagged request REQ 0 or REQ 1, absent override priority. Since the override functionality ensures the latency-tagged data transfer requests will be serviced in a timely fashion, providing a default preference for the conventional priority requests provides regular and timely service of these data transfer requests as well.

Referring to FIG. 8, the Legend identifies the various signal state combinations A–D that result in transitions from one to another of the operating states of the memory control state machine 74. The "/" positioned at the beginning of a signal name indicates that the signal is deasserted. The "+" symbol indicates a logic "OR" combination of signal states, and the "." indicates a logic "AND" combination of signal states, with conventional order-of-operations rules applying. The signal state combination A then corresponds to deasserted REQ 0 AND deasserted REQ 1 AND deasserted PREQ. The signal state combination B corresponds to deasserted PREQ AND asserted REQ 0 OR asserted OVR AND asserted SRVC 0. The signal state combination C corresponds to deasserted PREQ AND deasserted REQ 0 AND asserted REQ 1 OR asserted OVR AND asserted SRVC 1. The signal state combination D corresponds to asserted PREQ AND deasserted OVR.

As shown in FIG. 8, the signal state combination A causes the memory control state machine 74 to transition to or remain in an IDLE operating state 80. The signal state combination B causes the memory control state machine 74 to transition to or continue in a SERVICE REQ 0 operating state 82, in which the memory control state machine asserts the acknowledge signal ACK 0 and applies the requisite memory control signals to the memory 30 to provide the requested data transfer. The signal state combination C causes the memory control state machine 74 to transition to or continue in a SERVICE REQ 1 operating state 84, in which the memory control state machine asserts the acknowledge signal ACK 1 and applies the requisite memory control signals to the memory 30 to provide the requested data transfer. The signal state combination D causes the memory control state machine 74 to transition to or continue in a SERVICE PREQ operating state 86, in which the memory control state machine asserts the acknowledge signal PACK and applies the requisite memory control signals to the memory 30 to provide the requested data transfer.

Of course, those skilled in the art will appreciate that the state diagram shown in FIG. 8 can be readily modified to represent the operation of the memory control state machine 74 receiving multiple latency-tagged requests REQ 0-REQ N and multiple conventional priority requests PREQ 0-PREQ M. Those skilled in the art will also appreciate that the various signal state combinations causing transition in operating states can be modified during operation of the memory control state machine 74 to accomplish rotating default priorities (i.e., ordering memory accesses absent a latency override priority condition) or other arbitration schemes in addition to the latency-tagged arbitration method and circuitry described above.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of transferring data between a memory and an I/O device in a computer system, comprising:

receiving a data transfer request from the I/O device;

receiving a latency identifier value from the I/O device, the latency identifier value corresponding with a maximum time interval for servicing the data transfer request;

waiting for a time interval no greater than the maximum time interval;

modifying the latency identifier value;

determining if the modified latency identifier value falls within a predetermined range of values; and if the modified latency identifier value falls within the predetermined range of values, then initiating servicing the data transfer request within the maximum time interval by transferring data between the memory and the I/O device.

2. A method according to claim 1 wherein modifying the latency identifier value includes decrementing the latency identifier value, and wherein determining if the modified latency identifier value falls within a predetermined range of values includes determining if the modified latency value is no greater than a predetermined value.

3. A method according to claim 1 wherein waiting for a time interval no greater than the maximum time interval comprises:

repeatedly modifying the latency identifier value until the latency identifier value falls within a predetermined range of values; and when the latency identifier value falls within the predetermined range of values, initiating servicing the data transfer request.

4. In a computer system having a memory for storing data, first and second I/O devices each operable to transfer data between the I/O devices and the memory, and a memory controller coupling the memory with the first and second I/O devices and operable to control data transfer operations therebetween, a method of controlling the timing of the data transfer operations, comprising:

receiving a first request from the first I/O device for a first data transfer between the memory and the first I/O device;

receiving a first latency identifier from the first I/O device, the first latency identifier from the first I/O device corresponding with a maximum time interval in which to perform the first data transfer;

receiving a second request from the second I/O device for a second data transfer between the memory and the second I/O device;

receiving a second latency identifier from the second I/O device, the second latency identifier from the second I/O device corresponding with a maximum time interval in which to perform the second data transfer;

comparing the first and second latency identifiers;

selecting one of the first and second latency identifiers as determined by the comparison of the first and second latency identifiers;

comparing the selected one of the first and second latency identifiers to a predetermined value; and performing the one of the first and the second data transfers corresponding to the selected one of the first and second latency identifiers at a time determined by the comparison of the selected one of the first and second latency identifiers to the predetermined value.

5. A method according to claim 4, further comprising:

modifying the first latency identifier;

modifying the second latency identifier;

comparing the modified first latency identifier and the modified second latency identifier; and wherein performing the first and second data transfers in an order corresponding to the comparison of the first and second latency identifiers includes performing the first and second data transfers in an order corresponding to the comparison of the modified first and second latency identifiers.

6. A method according to claim 5 wherein modifying the first and second latency values includes decrementing the first and second latency values.

7. A method according to claim 4 wherein comparing the selected one of the first and second latency identifiers to a predetermined value includes determining whether the selected one of the first and second latency identifiers exceeds the predetermined value, and wherein performing the one of the first and second data transfers at a time determined by the comparison includes performing the one of the first and second data transfers at a time when the selected one of the first and second latency identifiers no longer exceeds the predetermined value.

8. In a memory controller operable to receive a plurality of requests from a plurality of I/O device for access to a memory coupled with the memory controller, a method of prioritizing service of the requests, comprising:

receiving a plurality of latency values from respective I/O devices making the requests for access to the memory, each of the latency values corresponding to a respective one of the requests;

comparing the latency values to determine a least latency value;

servicing the request corresponding to the least latency value if the least latency value falls within a predetermined range of values by transferring data between the memory and the I/O device from which the least latency value was received;

modifying the latency values; and repeating comparing the latency values and servicing the request.

9. A method according to claim 8 wherein modifying the latency values includes decrementing the latency values.

10. A method of transferring data between a memory and a plurality of I/O devices in a computer system, comprising:

receiving a plurality of data transfer requests, each from a respective one of the I/O devices;

receiving a plurality of respective latency identifier values, each of the latency identifier values corresponding to a time interval for servicing a respective one of the data transfer requests;

comparing the latency identifier values to each other;

selecting one of the latency identifier values as determined by the comparison of the latency identifier values to each other;

determining if the selected one of the latency identifier values falls within the predetermined range of values, then initiating servicing the respective one of the data transfer requests.

11. A method according to claim 10 wherein servicing the data transfer requests in a sequence determined by the latency identifier values includes comparing the latency identifier values to each other.

12. A method according to claim 10 wherein servicing the data transfer requests in a sequence determined by the latency identifier values includes successively modifying each of the latency identifier values and comparing the modified latency identifier values to each other.

13. A method according to claim 10 wherein servicing the data transfer requests in a sequence determined by the latency identifier values includes comparing the latency identifier values to a predetermined value.

14. A method according to claim 10 wherein servicing the data transfer requests in a sequence determined by the latency identifier values includes successively modifying each of the latency identifier values and comparing the modified latency identifier values to a predetermined value.

15. A method according to claim 10 wherein servicing the data transfer requests in a sequence determined by the latency identifier values includes:

modifying the latency identifier values;

comparing the modified latency identifier values to each other;

selecting one of the modified latency identifier values as determined by the comparison of the modified latency identifier values to each other;

determining if the selected one of the modified latency identifier values falls within a range of predetermined values; and if the selected one of the modified latency identifier values falls within the predetermined range of values, then initiating servicing of the respective one of the data transfer requests.

16. A method according to claim 15 wherein:

modifying the latency identifier values includes decrementing the latency identifier values;

selecting one of the modified latency identifier values includes selecting a lowest of the decremented latency identifier values; and determining if the selected one of the modified latency identifier values falls within a range of predetermined values includes determining if the lowest of the decremented latency identifiers is less than a predetermined value.

* * * * *